(12) United States Patent
Pohjola

(10) Patent No.: US 6,472,770 B1
(45) Date of Patent: Oct. 29, 2002

(54) INTELLIGENT CURRENT DISTRIBUTION SYSTEM AND METHOD FOR MANUFACTURING THE SAME

(75) Inventor: Jorma Pohjola, Varjakka (FI)

(73) Assignee: IWS International, Inc., Oulu (FI)

( * ) Notice: Subject to any disclaimer, the term of this patent is extended or adjusted under 35 U.S.C. 154(b) by 0 days.

(21) Appl. No.: 09/554,459
(22) PCT Filed: Nov. 13, 1998
(86) PCT No.: PCT/FI98/00885
§ 371 (c)(1), (2), (4) Date: May 12, 2000
(87) PCT Pub. No.: WO99/25585
PCT Pub. Date: May 27, 1999

(30) Foreign Application Priority Data

Nov. 14, 1997 (FI) .................................................. 974237
Nov. 14, 1997 (FI) .................................................. 974238

(51) Int. Cl.⁷ .............................................. B60R 16/02
(52) U.S. Cl. ..................................... 307/10.1; 307/9.1
(58) Field of Search ............................... 307/9.1, 10.1, 307/38–41; 701/49

(56) References Cited

U.S. PATENT DOCUMENTS

| | | | |
|---|---|---|---|
| 4,180,803 A | 12/1979 | Wesmeyer et al. | 340/164 R |
| 4,355,385 A | 10/1982 | Hampshire et al. | 370/85 |
| 4,516,121 A | 5/1985 | Moriyama et al. | 340/825.05 |
| 4,646,232 A | 2/1987 | Chang et al. | 364/200 |
| 4,956,561 A * | 9/1990 | Tamer | 307/10.1 |
| 5,313,460 A * | 5/1994 | Schmid | 370/85.1 |
| 5,508,689 A * | 4/1996 | Rado et al. | 340/825.06 |
| 5,637,933 A | 6/1997 | Rawlings et al. | 307/147 |
| 5,670,845 A * | 9/1997 | Grant et al. | 315/77 |
| 5,844,501 A * | 12/1998 | El-Ibiary | 340/870.17 |
| 6,107,696 A * | 8/2000 | Peter et al. | 307/10.1 |
| 6,249,060 B1 * | 6/2001 | Osha | 307/10.1 |
| 6,331,823 B1 * | 12/2001 | El-Ibiary | 340/870.16 |

FOREIGN PATENT DOCUMENTS

| | | | |
|---|---|---|---|
| EP | 0266704 | 5/1988 | B60R/16/02 |
| EP | 0791505 | 8/1997 | |
| EP | 0791506 | 8/1997 | B60R/16/02 |
| EP | 0564943 | 6/2001 | |
| SE | 0507046 | 3/1998 | G06F/13/40 |
| WO | 9310591 | 5/1993 | |
| WO | 9515594 | 6/1995 | |
| WO | 9702965 | 1/1997 | |
| WO | 9830961 | 7/1998 | G06F/13/40 |

* cited by examiner

Primary Examiner—Fritz Fleming
(74) Attorney, Agent, or Firm—Davidson, Davidson & Kappel, LLC

(57) ABSTRACT

The invention relates to an intelligent current distribution system and a method for manufacturing the same. The current distribution system is particularly intended for vehicles. In the method, a current distribution cable (3) is fitted with intelligent connecting sockets (1, 2), which are provided with output pins (8) for supplying current to loads to be connected to the system and with switches (18a) for distributing current to the output pins (8) as well as with control electronics (19) for controlling the switches (18a) on the basis of control messages received from a message communication bus (17) of the cable (3) or from a socket input connector (10). Prior to or after connecting the randomly selected sockets (1, 2) to the cable (3), the control electronics (19) of each socket is programmed with individual behave programs (26), which are preordained on the basis of the location of the socket (1, 2) on the table. The sockets (1, 2) of the system communicate with each other directly via the bus, without intermediation of a central control unit.

7 Claims, 6 Drawing Sheets

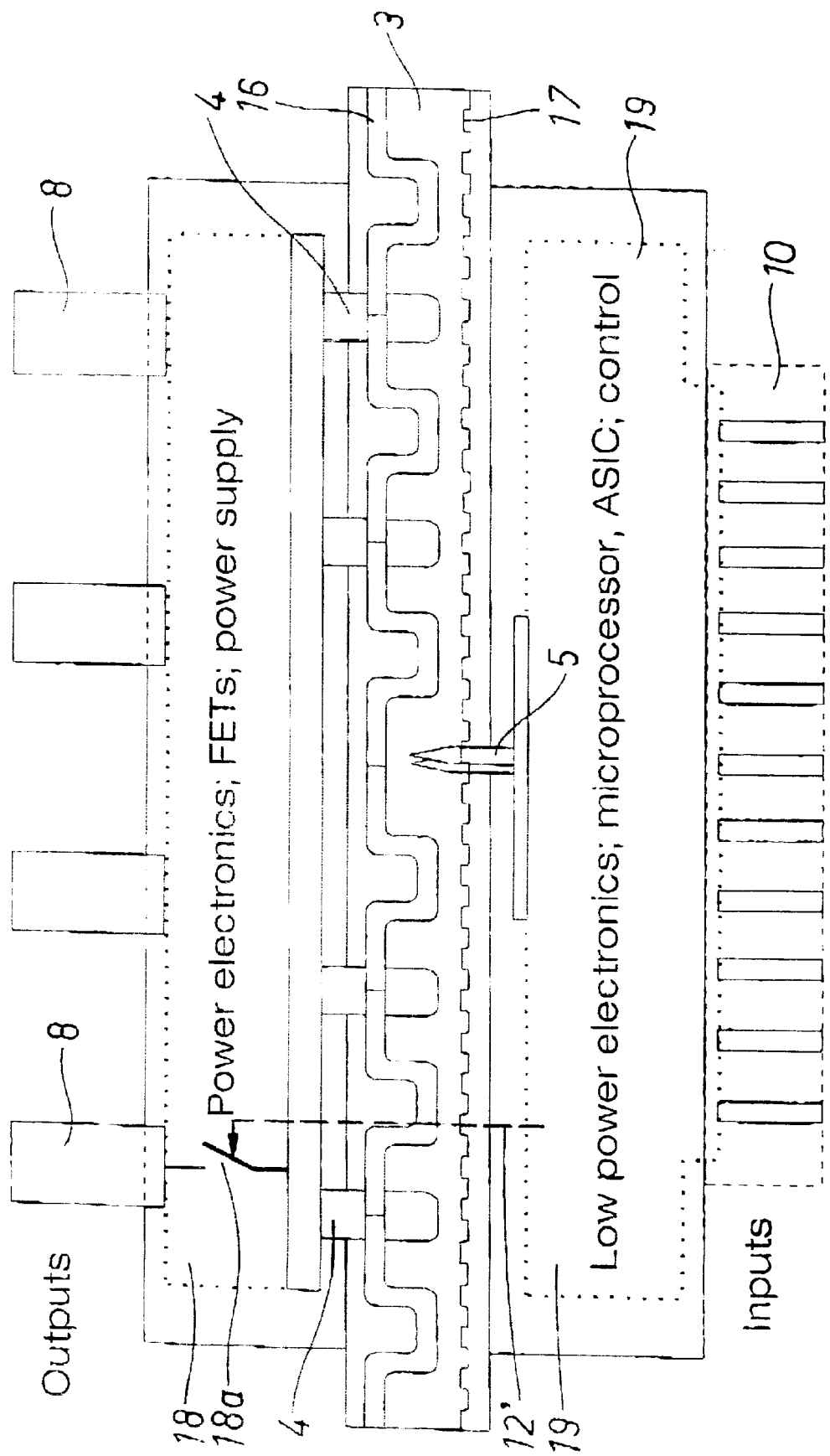

INTELLIGENT CURRENT DISTRIBUTION SYSTEM AND METHOD FOR MANUFACTURING THE SAME

BACKGROUND OF THE INVENTION

The present invention relates to an intelligent current distribution system, comprising

- a current distribution cable for supplying current to loads;
- a message communication bus for controlling the current supply;
- a plurality of predefined control messages for performing a plurality of predefined functions, each control message including specified data for performing a predefined function;
- intelligent contact sockets connected to the current distribution cable and message communication bus:
- output connectors included in a plurality or all of the sockets for supplying current to the loads;
- input connectors included in a plurality or all of the sockets for inputting said control messages into the system;
- switches included in a plurality or all of the sockets for distributing current to the output connectors in a controlled manner;
- control electronics included in each socket for controlling the message communication and, when necessary, for controlling the switches on the basis of the control messages received from the communication bus or from the socket input connector.

The invention relates also to a method for manufacturing an intelligent current distribution system, especially for vehicles, in which method a current distribution cable is fitted with intelligent connecting sockets provided with output pins for supplying current to loads connected to the system and with switches for distributing current to the output pins as well as with control electronics for controlling the switches on the basis of control commands received from a message communication bus of the cable or from a socket input connector.

This type of current distribution system is prior known e.g. from publication WO 93/10591, WO 95/15594, EP-564943, AND WO 97/02965.

A weakness in these prior known systems is that too much intelligence required for commanding and control of functions is concentrated in the central control unit of the system, whereby the communication becomes congested and the system is impaired in terms of its operating reliability. In order to reduce this drawback there has been proposed in European patent application EP-0 791 506 A2 to use highly intelligent node controllers under control of a central controller which sends a single command addressed to the proper intelligent node which in turn is provided with individual operation instructions for controlling the load connected to the node. One of the node controllers may be employed as a central controller. Because of need of the central controller there is still considerable reciprocating traffic between every node and the central controller which has to transmit every single command, query its performance and receive any condition messages from the nodes. Addressing the commands with node specific addresses provides an additional burden to data transmission because most of the commands or control messages are planned to be recognized or identified by several nodes.

On the other hand, the decentralization of intelligence in such a manner that the connector sockets would be provided with individual intelligence, as required by the different operating needs of various loads and actuators connected therewith, creates production-related problems for manufacturing various optional system configurations on an automated line.

SUMMARY OF THE INVENTION

An object of the invention is to provide an intelligent current distribution system, wherein not only the intelligence required for the individually instructed control of the functions of sockets has been removed from the central control unit of the system but also the need of a predestinated central control unit and socket specifically addressed commands therefrom are avoided and instead, the mastering control as well as transmission and identification of function specifically addressed commands are decentralized to the sockets, whereby the required communication further diminishes and the commands or control messages become simpler.

Another object of the invention; is to provide a method, whereby a current distribution system can be manufactured by automated production despite the fact that the intelligence required for the individual control of the functions of sockets has been removed from the central unit of the system and decentralized to the sockets.

A further object of the invention is to provide flexible automated production, capable of manufacturing a cable set for a single system one at a time, while keeping in mind the above-mentioned object for decentralizing the intelligence to sockets.

These objects of the invention are achieved on the basis of the characterizing features set forth in claim 1 for the system and on the basis of the characterizing features set forth in claim 10 for the method.

The non-independent claims disclose preferred embodiments of the invention.

BRIEF DESCRIPTION OF THE DRAWINGS

The system and method of the invention will now be described in more detail by way of working examples, with reference made to the accompanying drawings, in which

FIG. 5 shows schematically a cable in longitudinal section and a socket securely mounted on the cable by using a method of the invention;

DETAILED DESCRIPTION OF THE INVENTION

Figure 1:
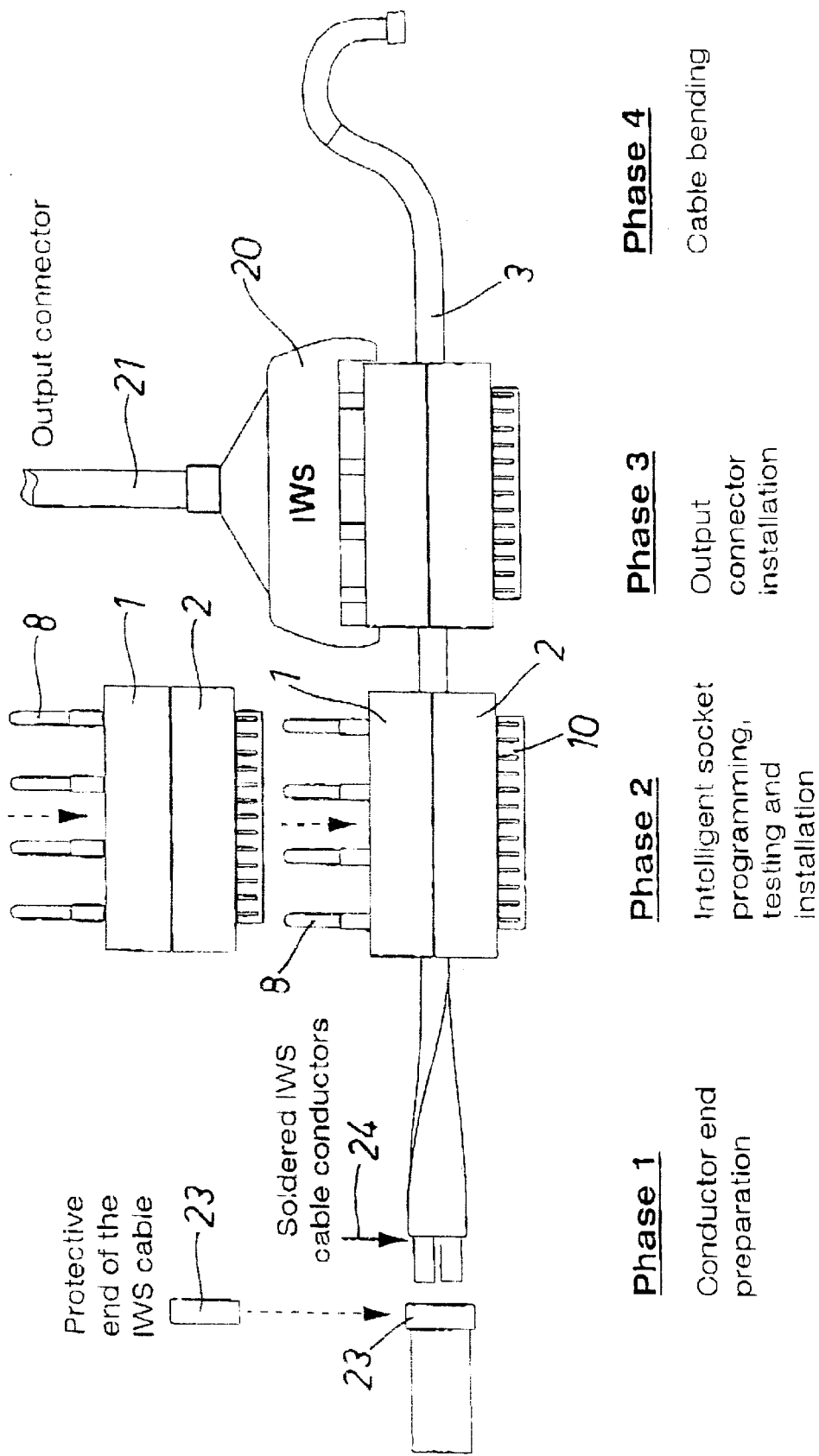
FIG. 1 depicts four different phases in the manufacture of a single cable branch included in the system.

In the first phase of FIG. 1, an unrolling cable 3 is cut off into a cable branch of desired length. A single electric harness may include a number of cable branches of varying lengths, which are intended to be fitted with any desired number of sockets 1, 2 which may also be different types from one another but are similar within each type. The cutoff end of the cable 3 is stripped (an arrow 24) and the ends of conductors are soldered for subsequent mounting on a connecting module (not shown). Such a connecting module is needed for connecting the cable branches with each other and for communication between the system and auxiliary devices such as display and programming device.

Alternatively conductors of the cable branches may be connected to corresponding conductors of a common bus cable to form a uniform star-like bus with direct galvanic contact between the conductors of different cable branches. An adaption and monitoring unit (not shown) may be connected to data bus of such a system for reception of malfunction reports and for communication with exterior devices such as electronic ignition system and programming devices.

The connecting module or the adaption and monitoring unit may have some limited functions of a conventional central control unit but the command communication takes place mainly with direct inputs to the intelligent sockets on one hand, and between the sockets via the bus on the other hand, as explained later in more detail.

The other end of the cut-off point is fitted With a protective end 23.

From the cutting station the cable is carried to a programming and installation station for sockets, wherein the sockets are provided with an individual behave program (individual function instructions program) and the sockets are tested for appropriate operation After the testing, the sockets 1, 2 are secured to the cable 3 or malfunctioning sockets are discarded and a new socket is picked up for programming and installation.

Figure 2:
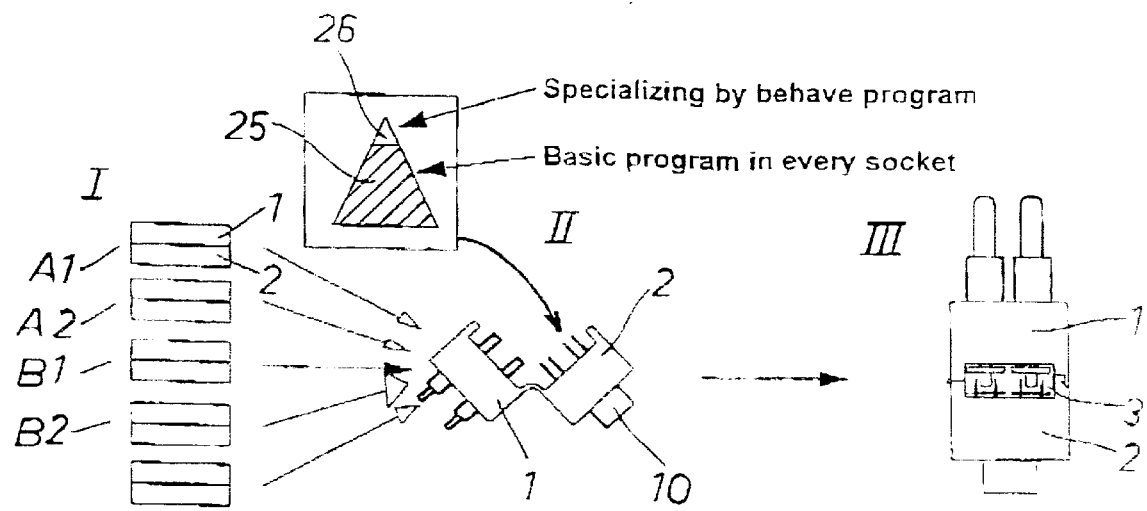
FIG. 2 shows schematically various sequences I, II, III in phase 2 of FIG. 1

FIG. 2 illustrates the procedure of phase 2 in FIG. 1. The first step is to select a type of socket A1, A2, B1, B2. The types of sockets may differ from one another e.g. in such a way that the A-type sockets have power switches 18a (FIGS. 5 and 6) positioned between the plus and the load of a battery and the B-type socket has two switches 18a positioned between the plus and the load and two switches between the minus and the load. The B-type socket can be used e.g. for controlling a single electric motor in both directions. Regardless of the above division in terms of types, the sockets may differ from each other in terms of whether or not they are provided with an Input connector 10. A socket without an input connector 10 may be provided with increased number of low power outputs for signal lights of instrument board, for instance. The system may also have an input socket without power outputs. Such an input socket may have increased number of inputs and it may be placed in the instrument board. The input connector 10 can be used for delivering therethrough control commands to the system, which can be transmitted to any socket in the system. Thereby, any of the sockets transmitting is a master controller of the system while the other sockets receiving the message are slave controllers as disclosed later in more detail.

FIG. 2 depicts schematically a pyramid, representing a program for socket control electronics, such as a processor. A bottom section 25 of the pyramid represents a basic program common to all sockets, which is included in sockets during the course of manufacturing the same. Prior to or after connecting a socket to the cable 3, socket control electronics 19 is further programmed with a behave program 26 for an individual socket behaviour, having its various sub-programs predetermined on the basis of future functions of the socket 1, 2. On the other hand, the functions of each socket are specified on the basis of its position, since a socket at a given location is connected with given loads or actuators. Thus, when selecting this individual behave program, it is necessary to know both the numeral of the cable 3 and the numeral (location) of a socket in a particular cable. Alternatively, it is possible to provide the sockets of an entire system with running numbering or indexing for selecting the sub-programs 26 of a behave program accordingly. The behave program takes care of which messages are responded with a certain predetermined function, e.g. by connecting a current to a certain load at a certain time or by transmitting a message to the bus. In this case, the messages need not contain information for the identification of sockets (socket specific addresses) or information regarding a desired way of controlling the loads. In addition, the behave program may include e.g. the following features monitoring or controlling the action:

an upper and lower limit for a current picked up by a load connected to output pins 8 a controlled duration for the surge current of a load connected to output pins optional actions in case of a malfunction a priority level for the functions of actuators connected to various output pins 8.

The above list is not exhaustive as there may be several other additional load-specific features, such as delay times for switching functions on or off or switching on various combinations of switches 18a (FIGS. 5 and 6), depending on the control direction (e.g. for driving a DC-motor forward or backward).

Figure 6:
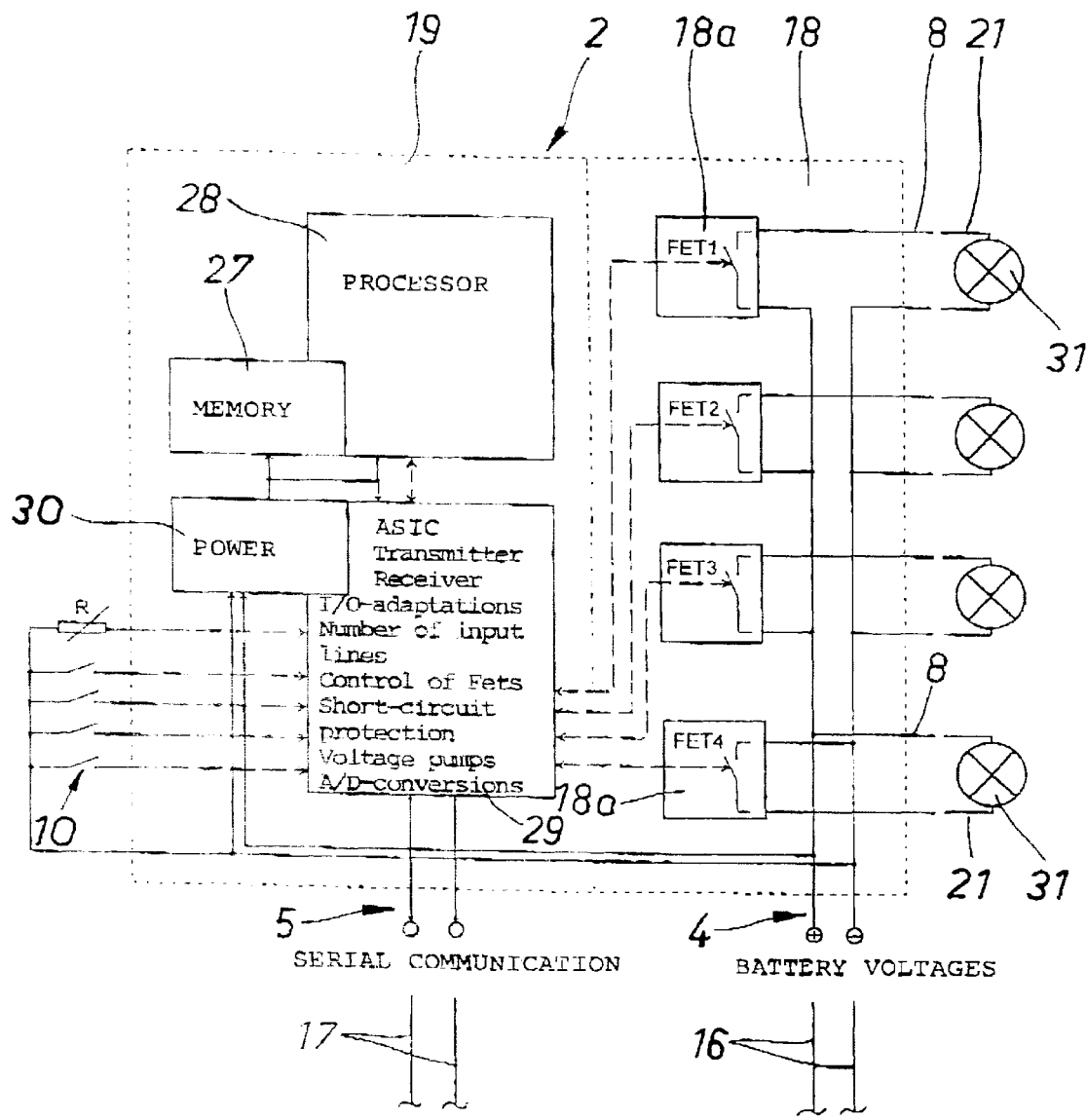
FIG. 6 shows an intelligent connecting base or socket of the system in a block diagram.
Figure 7:
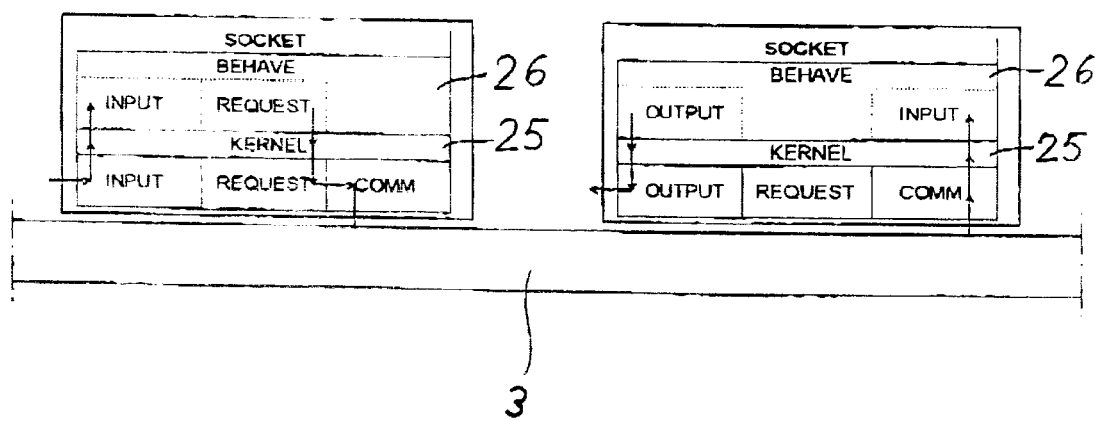
FIG. 7 shows schematically a software structure and progress of messages for a connecting base or socket.

FIG. 6 illustrates a program memory 27 which can be completely or partially inside a processor 28 and it may consist of several different types of su-memories (re-programmable and/or one time programmable). The memory 27 contains a basic program 25 (Kernel) controlling the operation of the processor 28 as well as a behave program 26 specific for each socket for controlling functions pre-ordained for this particular socket. FIG. 7 depicts a socket software structure and routes for messages coming from various sources The socket-specifically individual behave programs 26 identify the messages coming from the input 10 or from the serial communication bus 17 of the cable 3 and, on the basis thereof, control the processor 28 and/or an ASIC-circuit 29 to transmit messages to the serial communication bus 27 and/or to switch on desired FETs 18a for supplying current to an actuator 31. The basic program (kernel), which is identical in all sockets of the same type, takes care of how to control the socket switches 18a and message communication as well as functions of the processor. Kernel is the low level system program which serves as running base for the behave program Both programs are composed of operation specific modules composed of operation specific objects such as transmitting and receiving objects of various control messages. Behave program defines socket specific receiving objects for all the messages which are predetermined to be identified by the program. Basic program (Kernel) requests for input service routine of behave program to use the matching operation specific module each time the state of input changes. Thus, the basic program performs the control of all socket functions, but it is not capable of independently deciding which actions are to be performed and when. When any message arrives in a socket, the basic program asks the behave program as to which functions are required by this particular message. The behave program informs the basic program as to which actions it must choose to be carried out from among the selection of all various socket actions. Thus, the behave program commands response actions for various messages, which are specific for each socket. Hence, all that is required from the bus 17 is identification information for a desired function (function identification address). The behave program 26 takes care of which load 31 will be controlled and when Thus, the behave programs contained in the processor 28 and the memory 27 take care of the individual control of the loads 31 and the messages travelling along the bus 17 only express desired actions. The messages need not contain information or address for the identification of sockets, nor information regarding the way of controlling the loads (what, when, how). The behave program of a socket identifies when a message is such that the socket must perform the functions pre-appointed thereto.

FIG. 6 shows just one type of socket (the above-mentioned socket type A1), but it is obvious that the number of switches 18a and the connection between current conductors 16 and loads 31 may be subject to a variety of modifications. In a system of the invention, a single message can be used for performing a variety of functions in loads connected to various sockets. Likewise, in one and the same socket, a single message can be used for performing a variety of functions as long as the socket is pre-programmed to that effect in this way the various sockets can be used with automatic selection as master or slave controllers communicating with each other with function specifically addressed messages.

When a behave program of any socket creates or selects from its message database a control message in response to any input and transmits the massage to the communication bus, the socket becomes temporarily a master socket. The program of the master socket has provided the transmitted message with a function identification code or function specific address matching with the input. The code or address can be identified by any such receiving socket which is predetermined by its behave program to perform the corresponding function. The identification or index numbers of all such receiving sockets are also present in the program or message database of the transmitting master socket, but these numbers are not included in the transmitted control message but used later in the transmitting master socket for quitting its mastering after acknowledge messages from all the sockets intentioned to be the function performing sockets or, to be a new master socket if the program of receiving socket is provided with such response to the message.

Any socket 1,2 receiving control message from the communication bus 17 responds to the message by delaying transmitting of any message via such a socket to the communication bus 17 during said reception in order to prevent data collision with the received control message.

After having transmitted but before quitting, the master socket is in a mode to receive and check the acknowledge messages. In that mode the master socket is blocked to send a new message which is delayed if inputted. If all the indexed sockets predetermined to perform the function do not acknowledge the identification of the control message within a very short predetermined time (e.g. a few milliseconds), the master socket repeats transmitting the control message. If still an acknowledgement is lacking, the master socket transmits a fault message with identification or index number of the socket which did not respond to the control message. The faulty socket can be checked an if necessary, is replaced by a new socket which is being programmed either before or after its installation with behave programs predetermined to its index number. As is apparent from the foregoing, the socket specific addresses are included in the acknowledge messages of the slave sockets as well as in any fault indication messages, but not in function control messages or commands.

Of course, if any socket performs a function inputted from its own input 10, without transmitting any control message to the bus 17, the socket in question is its own master and slave. This mode of function is rather usual in the system, but it is not practical in terms of wiring requirements to input all commands to the same sockets which are performing the corresponding functions.

Each command or message has one of the several different priority levels which are also programmed in basic programs (operation instruction programs) and/or in behave programs (socket specific function control programs) of a plurality or all of the sockets. The priority level of any command or message is identified inherently by the program upon identification of the predetermined function. The priority level indication code is attached with the command or message under control of the particular behave program which is responsible on the transmitting of the command or message With these provisions, if any function is ON when command of a new function is inputted, there are several options depending on the priority levels predefined for the functions: (1) the prevailing function may be maintained or (2) replaced by the new one or, if so allowed by the programs, (3) both functions are performed simultaneously.

So, any socket can communicate and perform functions at different priority levels depending on the predefined priority levels of the functions they are dealing with.

The communication in the bus is started by any of the sockets. Each function specific message includes or is associated with a priority level indication address as a preamble of the message. The higher is the priority, the more easily the message passes to the bus. When a socket is first transmitting a priority level address it is simultaneously listening that the bus sets itself to the corresponding state "1" or "0". If several sockets are transmitting at the same time, they are first syncronized by a start bit and thereafter compare bit by bit the state of the bus with the bits of priority level address they are transmitting. If the transmitted and received bits are matching, the next priority level address bit is transmitted. The higher priority address has more zeros, which means that the lower address number with more zeros has higher priority level. If a socket is transmitting a recessive bit "1" of address and simultaneously receives a bus state "0", it means that there is on the bus a transmitting socket having message with higher priority. All the sockets which detect this deviation between transmitted and received bits, stop their transmission and remain to receive (listen). This bit arbitration passes through to the bus always the most important message with higher priority. After a predetermined time from the end of the message on the bus, transmitting of a new message is started by the same way, and this is continued as far as every socket desirable to transmit have transmitted. The explained bit arbitration with recessive bit "1" naturally provides proper impedance adaption between the microprocessor writing pin and the bus such that any "0" bit is dominating and can hold the bus at the corresponding state despite of one or more simultaneously transmitted "1" bits.

The priority level indication address may be the same as the function identification address or, it may be completed with further codes for the function identification. Normally the message is composed of said address for combined priority level and function identification, of a data section and of a check digit. Each receiving socket checks from the check digit that the reading of the message was correct. If the checking fails, new message is immediately requested. As an additional checking, all messages are acknowledged to the transmitting socket. So, there is double checking for each control message.

Figure 3:
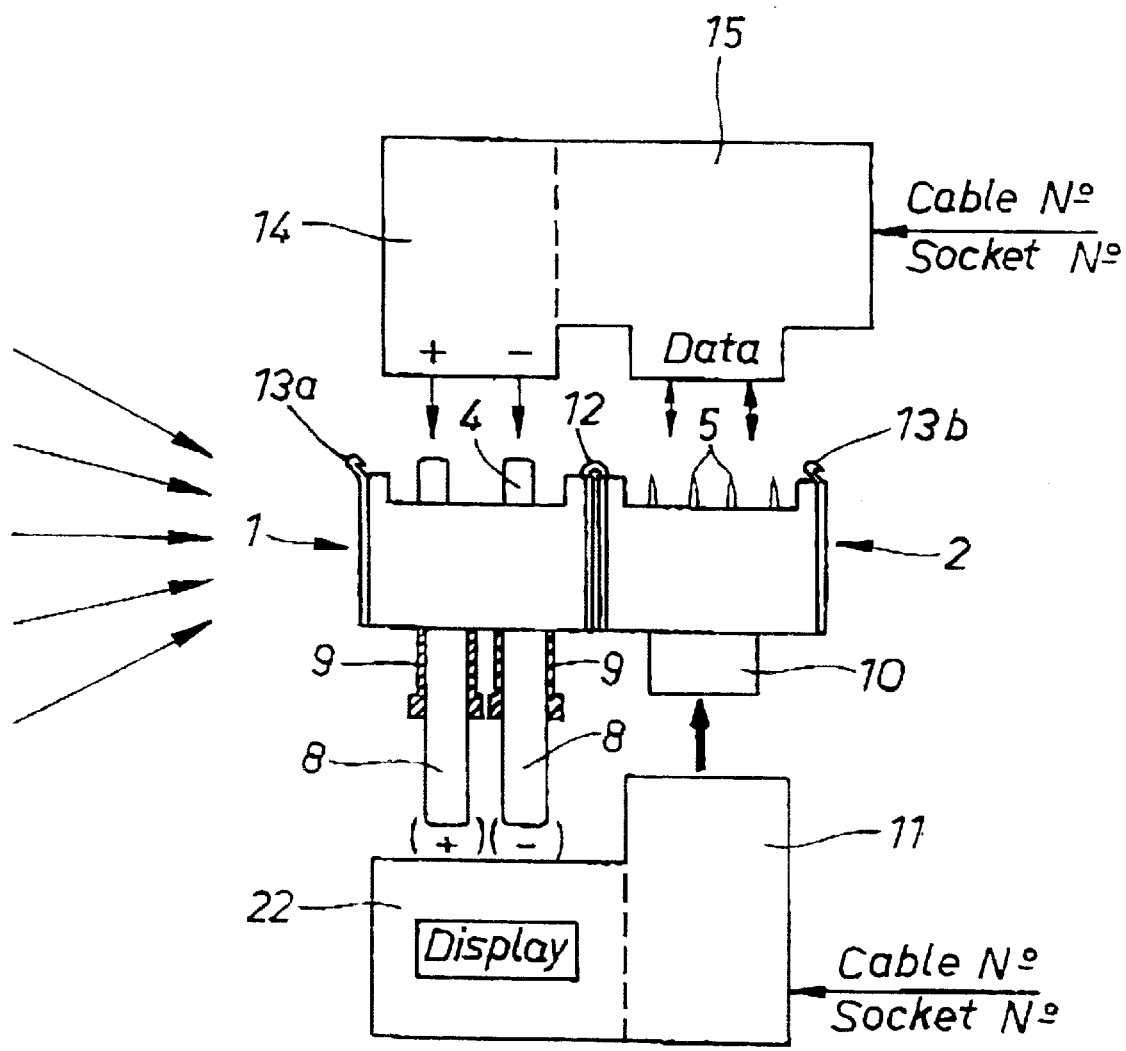
FIG. 3 shows more closely the procedure of sequence II in FIG. 2.

FIG. 3 shows schematically an assembly for programming individual behave programs in a socket and, immediately after the programming, for testing the socket for performance. Reference numeral 15 indicates a programming block which contains behave programs for all sockets in the system, from among which there will be selected given relevant subprograms to be delivered by way of message communication pins 5 of the socket or by way of separate programming pins to the socket processor 28 (FIG. 6) or to the memory 27 of some other intelligent electronic device 29. Prior to programming, the block 15 may test that the message communications of a socket through the pins 5 and input connector 10 are in working order. Thus, the socket must be capable of transmitting and receiving data through the message communication path or bus of a subsequently connected cable. A block 14 is used for supplying the socket with current through current pins 4. After the programming, a block 22 tests load functions, i.e. that switching-on of a voltage between the pairs of pins 8 occurs in accordance with control commands delivered from a block 11 or the block 15. One or both of the blocks 11, 15 contain all necessary control commands for a desired socket action. If the socket is of such a type that it has no input connector 10, the block 11 is naturally out of use. The block 22 can be provided with a display for reporting the test result. If a socket is malfunctioning, it will be discarded and another socket will be picked up for programming Depending on the type of memory, the programming can be effected as one time programming, whereby the program cannot be subsequently modified In case of damage, such a socket must be replaced with a pre-programmed socket. In case of using a re-programmable memory, it is possible, if a socket suffers damage, to program the socket that has replaced the previous one with an individual behave program from an adaptation and monitoring unit (not shown) of the system manually through the serial communication bus 17. In the latter case it is also possible to program all the sockets of the system after fitting with the cable, instead of the sequence shown in FIGS. 2 and 3.

Figure 4:
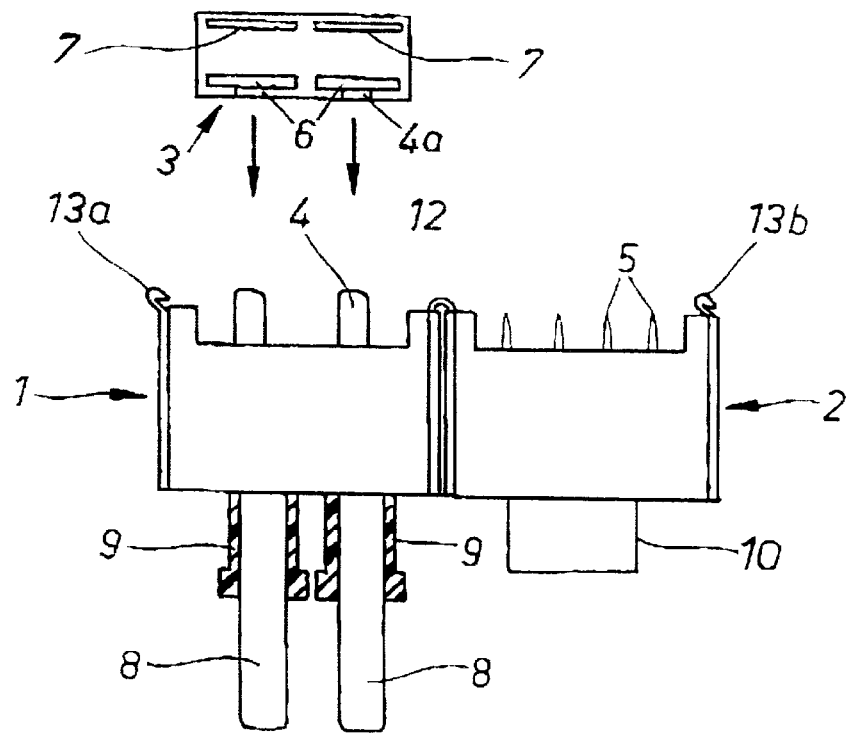
FIG. 4 shows more closely the procedure of sequence III in FIG. 2.

According to embodiment as shown in FIGS. 2 and 3, when a socket has been programmed with an individual behave program and tested, the socket 1,2 is connected to the cable 3. FIG. 4 illustrates how the cable is connected to the current pins 4. Therefore, the cable has its insulating sheath provided with slots 4a and also current conductors 6 can be provided with preliminary slits or preliminary holes. After pressing the cable 3 into the pins 4, the other half of a socket is closed, whereby the message communication pins 5 also penetrate the cable insulating sheath and message communication conductors 7, thus completing phase III in FIG. 2.

Furthermore, FIG. 5 shows in a longitudinal section how a power electronics portion 18 is separated from low power electronics 19 so as to position these on opposite sides of the cable 3. Thus, the heat generation of power electronics does not interfere with the operation of the microprocessor 28 and ASIC-circuit 29 as well as the program memory 27 of the control electronics side 19. One end of a socket is provided with conductors 12 for transferring the controls required by the FET-switches 18a from the control electronics 19 over to the power electronics side 18. There may be a plurality of successive current pins 4 in connection with current conductors 16 for establishing a secure contact. The connection with data conductors 17 can be established with sharp-pointed pins 5, two of which can be set side by side for a secure contact. The meandering of the conductors 16, 17 contributes to the flexibility of the cable 3.

As soon as the sockets have been programmed and connected to a cable, the following step is the attachment of output connectors 20 to the sockets. At least for the most part of it, this phase (phase 3 in FIG. 1) can also be automated, if that is desired. The automation involves the selection of an appropriate connector 20 from quite a large number of various connectors, which may differ from each other in terms of the length of a connecting wire 21 and/or in terms of actuators present at the other end of the wire 21 and/or in terms of the internal circuits of the connector 20 itself. Structurally, the output connectors 20 are mutually similar so as to be capable of being connected to mutually similar sockets. The appropriate connector 20 is thus selected on the basis of the location of a socket and the selected output connector 20 is attached to output pins 8 of the socket Optionally, the load connectors can be attached directly to a socket connector, whereby there is no need for any connecting wire 21.

The next phase (phase 4 in FIG. 1) involves bending of a cable to fit the subsequent installation site, thus producing one finished cable section for a current distribution system. All cable sections (e.g. 8 pieces) of any given system are manufactured in succession for producing, in the order of installation, cables required e.g. in the automobile assembly process advancing on a parallel line. As an alternative, it is possible to produce, at any given time, a vehicle-specific bundle of cables, said bundle being transferred over to a vehicle assembly line operating at another location.

In a manufacturing method of the invention, the four different operations or phases of FIG. 1 are carried out at four different work stations and a cable is advanced from one station to the next. For the sake of clarity, the various method phases in FIG. 1 are depicted in a single figure.

In a finished system the total number of sockets 1,2 is typically several tens, e.g. 30–100, and the number of cable branches is typically from 4 to 10. An additional advantage of the invention is in that the different outputs 8 of one and the same socket can be controlled by different sockets at different locations, and even the one and the same output 8 can be controlled to perform different functions at different times depending on the input means 10 used to control the output 8.

What is claimed is:

1. An intelligent current distribution system, comprising
a current distribution cable (3) for supplying current to loads (31);
a message communication bus (17) for controlling the current supply;
a plurality of predefined control messages for performing a plurality of predefined functions, each control message including specified data for performing a predefined function;
intelligent contact sockets (1,2) connected to the current distribution cable (3) and message communication bus (17);
output connectors (8/20) included in a plurality or all of the sockets (1,2) for supplying current to the loads (31);
input connectors (10) included in a plurality or all of the sockets (1,2) for inputting said control messages into the system;
switches (18a) included in a plurality or all of the sockets (1,2) for distributing current to the output connectors (8/20) in a controlled manner;
control electronics (19) included in each socket for receiving and transmitting various messages and for controlling the switches (18a) on the basis of the control messages received from the communication bus (17) or from the socket input connector (10), the control electronics (19) comprising a basic program (25) which is similar in said plurality or all of the sockets and is capable to perform all desired functions of any of said sockets; and is capable to perform all desired functions of any of said sockets; and a programmable behave program (26) which controls the basic program such that the basic program performs only the functions preselected to be performed by the socket containing the behave program; wherein any of the sockets or of a plurality of the sockets is arranged to control or to be controlled by at least one other socket of said sockets with direct communication between the sockets via the bus, without intermediation of a central control unit, to perform at least a portion of desired socket specific functions of the controlled socket;

at least a portion of the predefined control messages are provided with function identification addresses and are received from the communication bus (17) by a plurality or all of the sockets (1,2);

the behave program (26) of each socket is provided with one or more function control programs to perform one or more of the predefined functions upon receipt and identification of corresponding predefined control message;

each individual control message is identified on the basis of said function identification address for performing the corresponding function only by the sockets (1,2) having in their behave program (26) such a function control program which performs the function corresponding to the addressed predefined function;

each or several of said sockets (1,2) are provided with means (27, 28, 29) for transmitting at least one of the plurality of the predefined control messages to the communication bust (17) for receipt by the other sockets (1,2); whereby the system is controlled by a net-like controller composed of said plurality or all of the sockets (1,2) such that any of the sockets which is transmitting is temporarily a master controller while any other of the sockets which is receiving is a slave controller, the mutual relationship between master and slave controllers being automatically switchable upon change of their relation to transmission and receipt of the control message.

2. A system according to claim 1, characterized in that any socket (1,2) receiving control message from the communication bus (17) responds to the message by delaying transmitting of any message via such a socket to the communication bus (17) during said reception in order to prevent data collision with the received control message.

3. A system according to claim 1, characterized in that a plurality or all of the sockets (1,2) are provided with input means (10) for inputting at lest one of said predefined control messages to the corresponding socket, the behave program (26) of each such socket being provided with a function control program for either transmitting one or more of said inputted control messages to the communication bus (17) or blocking such transmission for use of the control message to control the load (31) connected only with the socket to which the control message was inputted by said input means (10).

4. A system as set forth in claim 1, characterized in that each socket has operating instruction programs and socket specific function control programs which contain preprogrammed priority levels for the function specific commands or messages.

5. A system as set forth in claim 1, characterized in that a plurality of the sockets have both an input connector (10) and means for receiving control inputs from the bus.

6. A system as set forth in claim 1, characterized in that different outputs (8) of one and the same socket (1,2) are controlled by two or more different sockets.

7. An intelligent current distribution system, comprising a current distribution cable (3) for supplying current to loads (31);

a message communication bus (17) for controlling the current supply;

a plurality of predefined control messages for performing a plurality of predefined functions, each control message including specified data for performing a predefined function;

intelligent contact sockets (1,2) connected to the current distribution cable (3) and message communication bus (17);

output connectors (8/20) included in a plurality or all of the sockets (1,2) for supplying current to the loads (31);

input connectors (10) included in a plurality or all of the sockets (1,2) for inputting said control messages into the system;

switches (18a) included in a plurality or all of the sockets (1,2) for distributing current to the output connectors (8/20) in a controlled manner;

control electronics (19) included in each socket for receiving and transmitting various messages and for controlling the switches (18a) on the basis of the control messages received from the communication bus (17) or from the socket input connector (10), wherein any of the sockets or of a plurality of the sockets is arranged to control or to be controlled by at least one other socket of said sockets with direct communication between the sockets via the bus, without intermediation of a central control unit, to perform at least a portion of desired socket specific functions of the controlled socket, and one and the same load output (8) of a socket (1,2) is controlled to perform different functions at different times depending on the control input to the socket.

* * * * *